United States Patent [19]

Nagai et al.

[11] Patent Number: 5,711,611
[45] Date of Patent: Jan. 27, 1998

[54] GUIDE MECHANISM

[75] Inventors: Shigekazu Nagai; Masahiko Someya; Hiroyuki Shiomi, all of Ibaraki-ken, Japan

[73] Assignee: SMC Kabushiki Kaisha, Tokyo, Japan

[21] Appl. No.: 661,112

[22] Filed: Jun. 10, 1996

[51] Int. Cl.$^6$ .................................................. F16C 29/04
[52] U.S. Cl. ........................... 384/50; 384/51; 384/54; 384/55
[58] Field of Search .................................. 384/54, 51, 53, 384/50, 55

[56] References Cited

U.S. PATENT DOCUMENTS 3,971,599  7/1976  Shio ................................... 384/54
5,427,454  6/1995  Tsuboi ............................... 384/51
5,553,946  9/1996  Agari ................................ 384/51

*Primary Examiner*—Lenard A. Footland
*Attorney, Agent, or Firm*—Oblon, Spivak, McClelland, Maier & Neustadt, P.C.

[57] ABSTRACT

A guide mechanism has a linear guide rail, a guide block displaceable along the linear guide rail, and a roller carrier plate interposed between the linear guide rail and the guide block and having an array of rollers held in line-to-line rolling contact with a side surface of the linear guide rail. The rollers roll in line-to-line rolling contact with the side surface of the linear guide rail, thus reducing resistance to the movement of the guide block along the guide rail and minimizing wear on the rollingly contacting components.

11 Claims, 6 Drawing Sheets

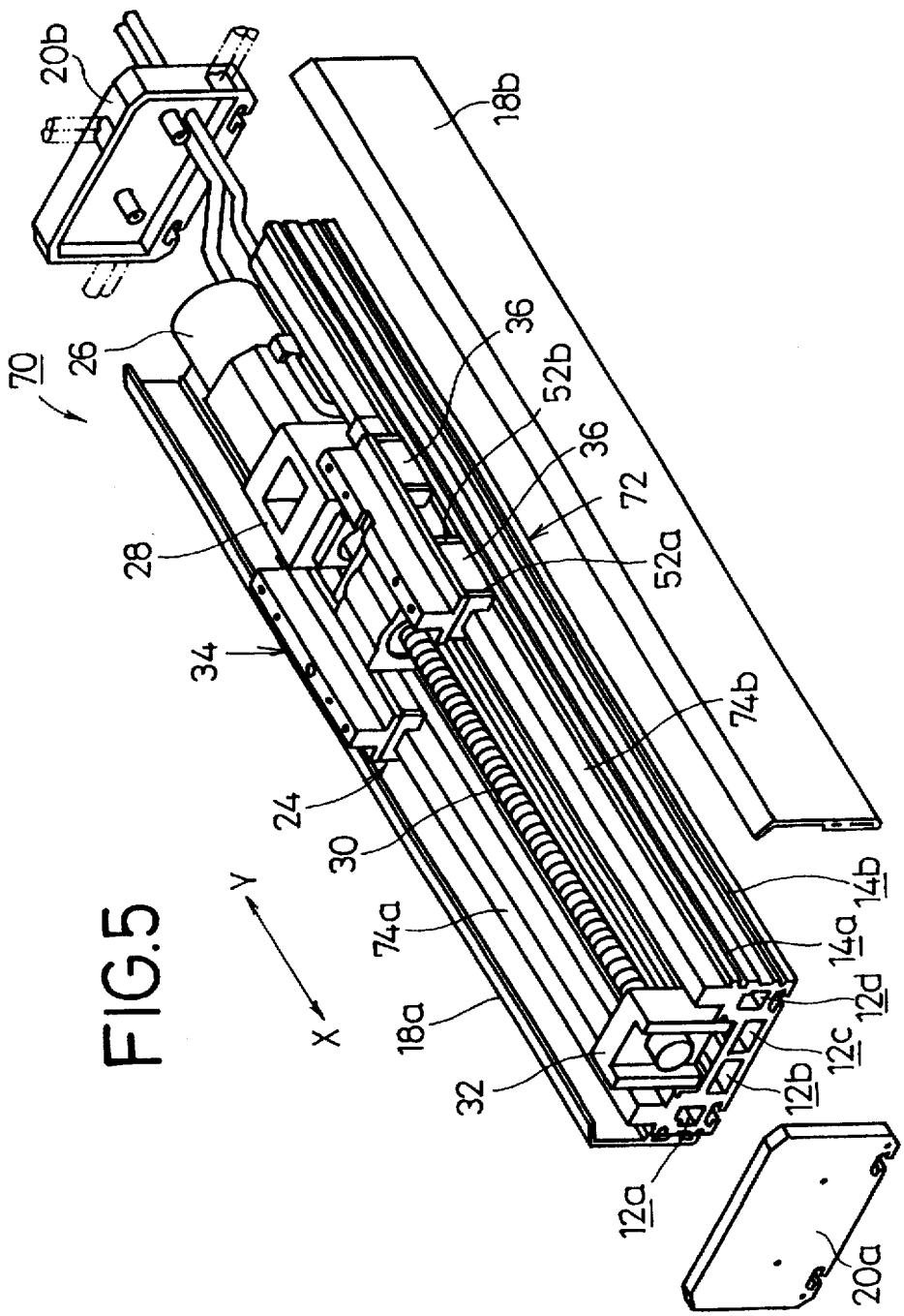

GUIDE MECHANISM

BACKGROUND OF THE INVENTION

1. Field of the Invention

The present invention relates to a guide mechanism for guiding a workpiece to be displaced smoothly with an array of rollers rotatably supported on a guide block by a roller carrier plate and held in rolling contact with a guide rail.

2. Description of the Related Art

Actuators have heretofore been used to convey some workpieces. Such an actuator comprises a moving table which can be displaced in a longitudinal direction of an outer frame. A workpiece carried on the movable table is conveyed when the moving table is displaced while being guided by a guide mechanism.

Guide mechanisms incorporated in such actuators are roughly classified into slide bearing guides and a roller bearing guides according to the manner in which coacting guide surfaces contact each other.

A typical slide bearing guide comprises a guide block of a substantially C-shaped cross section which is slidable axially along an elongate rail that has a substantially square or rectangular cross section. The guide block supports thereon a moving table for carrying a workpiece.

A typical roller bearing guide comprises a plurality of components joined together which define a circulatory passage therein and a plurality of balls rollingly movable in the circulatory passage. A moving table for carrying a workpiece is mounted on the joined components.

In the slide bearing guide, the guide block and the rail have respective coacting surfaces that are slidably held against each other in face-to-face contact with other. Since these coacting surfaces are subject to large resistance to their sliding movement, they tend to wear quickly and hence develop an unduly large amount of play within a relatively short period of time in usage.

The roller bearing guide also suffers their own disadvantages in that it is expensive to manufacture the roller bearing guide because the circulatory passage has to be formed in the plural components, and the assembling process requires a high level of precision work in order to join the components without creating unwanted steps in the circulatory passage which is completed.

Conventional bearings for supporting rotatable shafts such as motor shafts include cylindrical roller bearings, conical roller bearings, etc. These roller bearings are preferably used in applications for bearing radial and/or thrust loads on the shaft which is being rotated.

SUMMARY OF THE INVENTION

It is general object of the present invention to provide a guide mechanism which includes a roller bearing incorporated in a linearly movable unit such as a linear actuator for reducing resistance to the movement of components of the linearly movable unit thereby to minimize wear on the components.

A major object of the present invention is to provide a guide mechanism which is of a relatively simple structure and can be manufactured relatively inexpensively.

According to the present invention, a guide mechanism has roller carrier plates interposed between a guide block and a guide rail, the roller carrier plates supporting rotatable rollers held in rolling contact with side surfaces of the guide rail. The rollers roll in line-to-line contact with the side surfaces of the guide rail for allowing the guide block to be displaced smoothly along the guide rail, thus reducing resistance to the movement of the guide block along the guide rail and minimizing wear on the roller carrier plates, the rollers, and the guide rail.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is an exploded perspective view of the guide mechanism shown in FIG. 1 which is incorporated in another linear actuator;

DETAILED DESCRIPTION OF THE PREFERRED EMBODIMENTS

Figure 2:
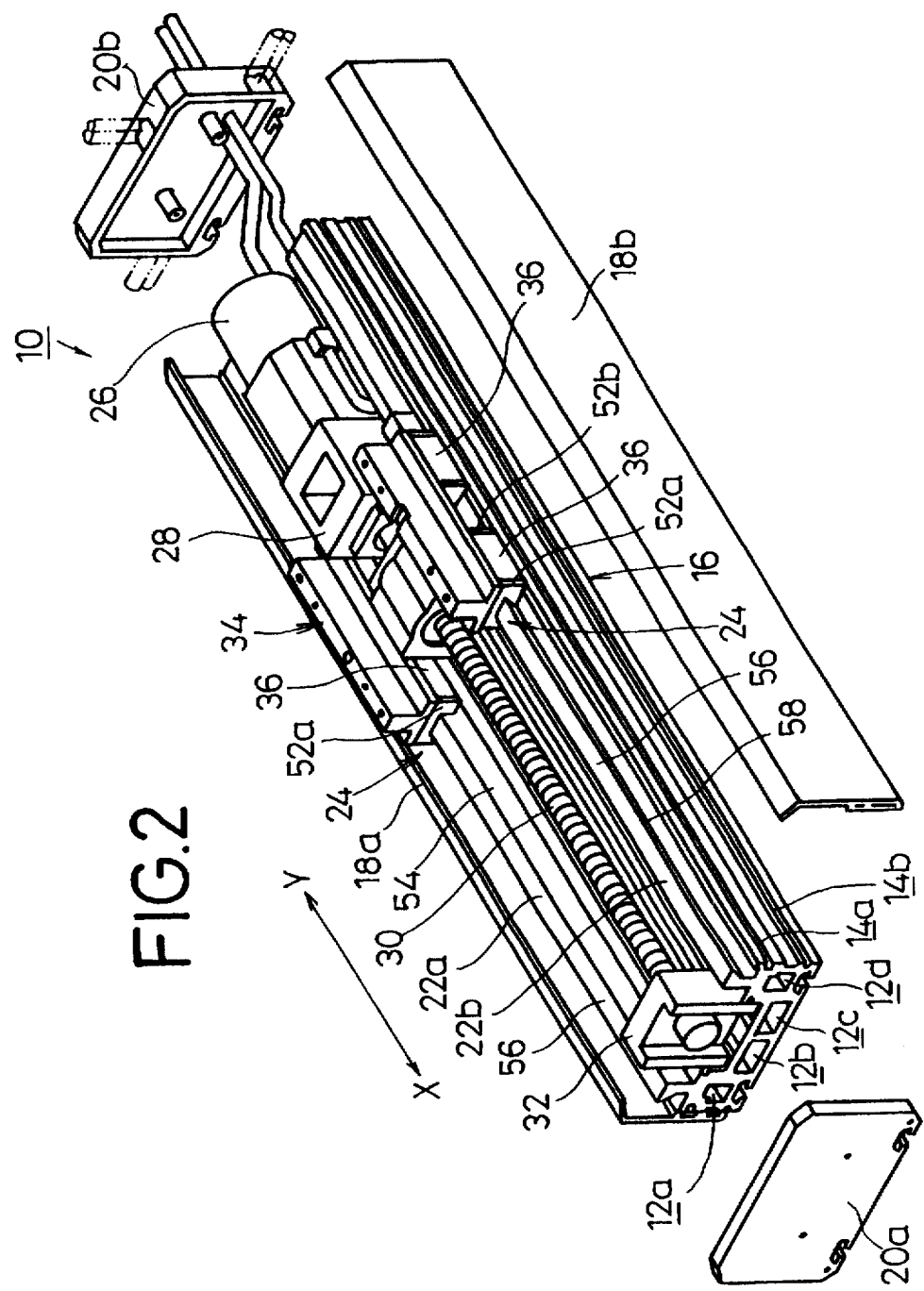
FIG. 2 is an exploded perspective view of the guide mechanism shown in FIG. 1 which is incorporated in a linear actuator.

FIG. 2 shows a linear actuator 10 which incorporates a guide mechanism according to an embodiment of the present invention. As shown in FIG. 2, the linear actuator 10 generally comprises an elongate frame 16 having a plurality of fluid passages 12a–12d defined therein and extending longitudinally therethrough and a pair of grooves 14a, 14b defined in each of opposite vertical side surfaces thereof and extending longitudinally therealong, a pair of side covers 18a, 18b attached respectively to the opposite vertical side surfaces of the frame 16 in covering relation to the grooves 14a, 14b, and a pair of end covers 20a, 20b mounted respectively on longitudinally opposite ends of the frame 16.

The frame 16 has a pair of guide mechanisms 24 disposed on an upper surface thereof and having respective laterally spaced parallel linear guide rails 22a, 22b extending longitudinally of the frame 16 and integrally formed with the frame 16. A motor 26 is fixedly mounted on the upper surface of the frame 16 between the guide rails 22a, 22b near one of the longitudinally opposite ends of the frame 16. A motor block 28 is disposed adjacent to the motor 26 and houses a drive power transmitting mechanism (not shown) for transmitting the drive power from the motor 26 to a ball screw 30 which extends in the longitudinal direction of the frame 16 and is disposed between the guide rails 22a, 22b. The ball screw 30 has one end coupled to the drive power transmitting mechanism and an opposite end rotatably supported by a support block 32 that is mounted on the other longitudinally opposite end of the frame 16.

A moving table 34 is held in threaded engagement with the ball screw 30 between the motor block 28 and the support block 32 for movement in the longitudinal direction of the frame 16, indicated by the arrows X, Y, upon rotation of the ball screw 30 about its own axis. Each of the guide mechanism 24 also has a guide block 36 fixed to a lower surface of the moving table 34.

Figure 1:
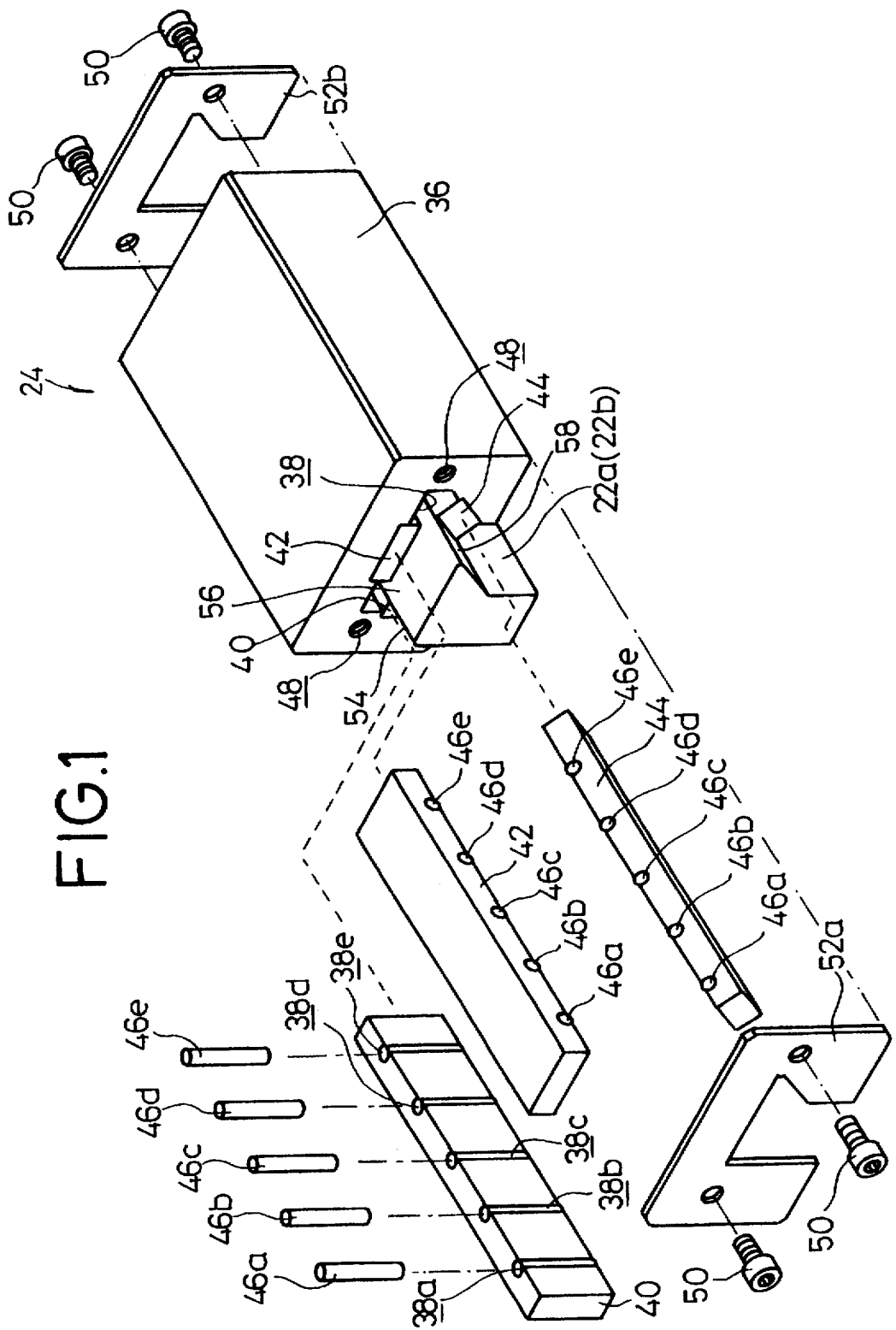
FIG. 1 is an exploded perspective view of a guide mechanism according to an embodiment of the present invention.

In each of the guide mechanisms 24, as shown in FIG. 1, the guide rail 22a (or 22b) is disposed in an channel 38 defined in the guide block 36 and opening downwardly. The guide mechanism 24 has first, second, and third elongate roller carrier plates 40, 42, 44 interposed between the guide rails 22a (or 22b) and the guide block 36 and each having a plurality of spaced transverse slots 38a~38e of a substantially arcuate cross section which are defined in the roller carrier plate and open at one side surface thereof, an array of substantially cylindrical rollers 46a~46e rotatably mounted in the respective slots 38a~38e of each of the first, second, and third elongate roller carrier plates 40, 42, 44, and a pair of end plates 52a, 52b fastened to respective longitudinally or axially opposite ends of the guide block 36 by screws 50 that are threaded into threaded holes 48 defined in the longitudinally opposite ends of the guide block 36. The first, second, and third elongate roller carrier plates 40, 42, 44 are held in position at their ends by the end plates 52a, 52b.

The guide rail 22a (or 22b) has a first longitudinal side surface 54, a second longitudinal side surface 56 extending substantially perpendicularly to the first side surface 54, and a third longitudinal side surface 58 extending obliquely at a predetermined angle from the second side surface 56 and inclined with respect to the first and second side surfaces 54, 56. Specifically, the third side surface 58 is joined to an end of the second side surface 56 remote from the first side surface 54 and is slanted progressively closely toward the first side surface 54 in a direction away from the second side surface 56. The channel 38 defined in the guide block 36 has a cross-sectional shape that is complementary in shape to the cross-sectional shape of the guide rail 22a (or 22b). Specifically, the first, second, and third side surfaces 54, 56, 58 are spaced a certain distance from corresponding inner wall surfaces of the channel 38, which have respective recesses defined therein. The first, second, and third elongate roller carrier plates 40, 42, 44 are inserted between the first, second, and third side surfaces 54, 56, 58 and the corresponding inner wall surfaces of the channel 38, and have outer surface portions, remote from the transverse slots 38a~38e, disposed in the respective recesses defined in the inner wall surfaces of the channel 38.

Figure 3:
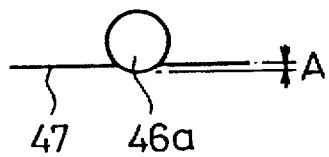
FIG. 3 is an enlarged side elevational view showing the relationship between a roller carrier plate and a roller.

As shown in FIG. 3, the outer circumferential surface of each of the rollers 46a~46e has a portion projecting a distance A from a side surface 47 of each of the roller carrier plates 40, 42, 44, which faces one of the first, second, and third side surfaces 54, 56, 58 of the guide rail 20a (or 20b). The rollers 46a~46e rotatably supported by the roller carrier plates 40, 42, 44 are held in rolling contact with the first, second, and third side surfaces 54, 56, 58.

Figure 4A:
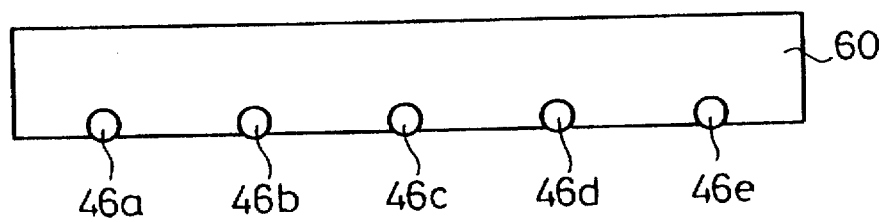
FIGS. 4A through 4C are side elevational views illustrative of different material modifications of a roller carrier plate and an array of rollers.
Figure 4B:
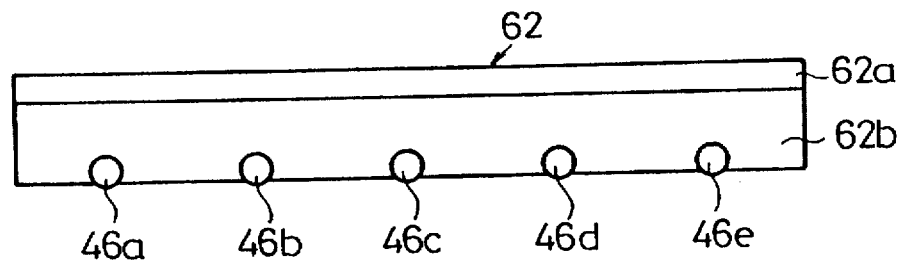
Figure 4C:
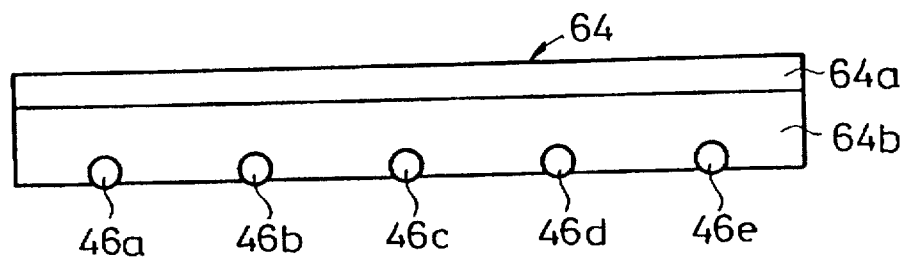

FIGS. 4A through 4C illustrate different material modifications of each of the roller carrier plates 40, 42, 44 and the rollers 46a~46e.

In FIG. 4A, a roller carrier plate 60 is made of an elastic material such as synthetic resin or the like, and rollers 46a~46e rotatably supported thereby are made of a metal material such as iron or the like.

In FIG. 4B, a roller carrier plate 62 comprises an upper surface layer 62a made of an elastic material such as synthetic resin or the like and a lower surface layer 62b made of a metal material such as iron or the like. Rollers 46a~46e rotatably supported on the lower surface layer 62b are made of a metal material such as iron or the like.

In FIG. 4B, a roller carrier plate 64 comprises an upper surface layer 64a made of an elastic material such as synthetic resin or the like and a lower surface layer 64b made of a metal material such as iron or the like. Rollers 46a~46e rotatably supported on the lower surface layer 64b are made of an elastic material such as synthetic resin or the like.

According to the modifications shown in FIGS. 4A through 4C, since either the roller carrier plates 60, 62, 64 are wholly or partly made of an elastic material or the rollers 46a~46e are made of an elastic material, they are capable of absorbing vibrations which are caused by rolling contact between the rollers 46a~46e and the guide rail 20a (or 20b).

Specifically, the roller carrier plates 60, 62, 64 shown in FIGS. 4A through 4e may be wholly or partly made as a solid body of ultra-high-molecular-weight polyethylene or a crystalline body of ultra-high-molecular-weight polyethylene which is impregnated with lubricating oil, grease, or the like, as disclosed in "Hostalen GUR topics" published by Hoechst AG, so that the rollers 46a~46e can smoothly be rotated in the slots 38a~38e. The roller carrier plates 60, 62, 64 may be curved in the longitudinal direction thereof for an automatic centering capability.

The linear actuator 10 which incorporates the guide mechanism 24 according to the present invention operates as follows:

The motor 26 is energized by a power supply (not shown). The rotational drive power from the motor 26 is transmitted through the drive power transmitting mechanism in the motor block 28 to the ball screw 30, which is rotated about its own axis to displace the moving table 34 in the direction indicated by the arrow X or Y in FIG. 2.

When the moving table 34 is displaced along the guide rails 22a, 22b, the rollers 46a~46e roll in line-to-line contact with the first, second, and third side surfaces 54, 56, 58 of the guide rails 22a, 22b. Therefore, any frictional resistance to the movement of the guide block 36 along the guide rail 22a (or 22b) and any wear on the rollingly contacting components, i.e., the roller carrier plates 40, 42, 44, the rollers 46a~46e, and the guide rails 22a, 22b, are much smaller than if a guide block were held in face-to-face sliding contact with a guide rail as is the case with the conventional guide blocks.

The guide mechanism 24 is made up of relatively simple components including the roller carrier plates 40, 42, 44 and the rollers 46a~46E rotatably fitted in the slots 38a~38e, respectively, in each of the roller carrier plates 40, 42, 44. Accordingly, the guide mechanism 24 can be manufactured easily and inexpensively.

The rollers 46a~46e held in rolling contact with the first, second, and third side surfaces 54, 56, 58 of the guide rails 22a, 22b exert substantially equal pressures on the first, second, and third side surfaces 54, 56, 58. Therefore, the guide block 36 can smoothly be displaced along the guide rail 22a (or 22b).

The guide mechanism 24 may be incorporated in various machines and devices including a motor-driven servo actuator, a pneumatic actuator, a rodless cylinder, or the like.

FIG. 5 shows the guide mechanism 24 shown in FIG. 1 which is incorporated in another linear actuator 70.

The linear actuator 70 shown in FIG. 5 differs from the linear actuator 10 shown in FIG. 2 in that each of guide rails 74a, 74b integrally formed with a frame 72 has a substantially square cross-sectional shape. Since other structural and functional details of the linear actuator 70 are the same as those of the linear actuator 10, those parts of the linear actuator 70 which are identical to those of the linear actuator 10 are denoted by identical reference numerals, and will not be described in detail below.

Figure 6A:
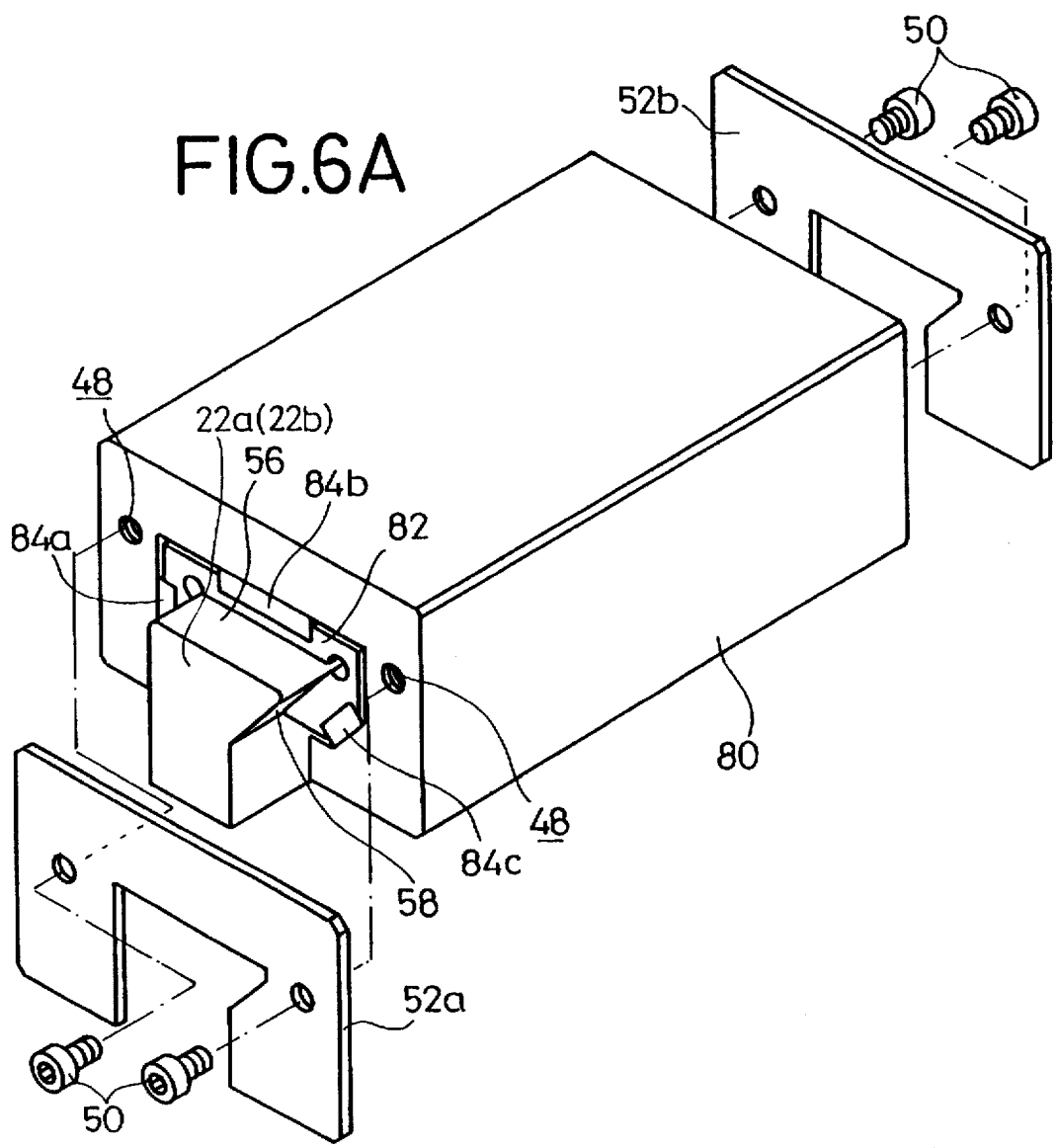
FIG. 6A is an exploded perspective view of a guide mechanism according to another embodiment of the present invention.
Figure 6B:
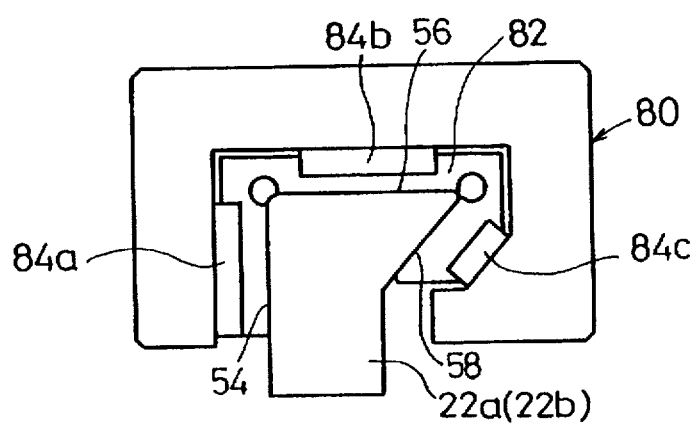
FIG. 6B is an end elevational view of the guide mechanism shown in FIG. 6A.

FIGS. 6A and 6B show a guide mechanism according to another embodiment of the present invention. The guide mechanism shown in FIGS. 6A and 6B is similar to the guide mechanism 10 except that a block 82 is interposed between the guide rail 22a (or 22b) and a guide block 80 in surrounding relation to the first, second, third side surfaces 54, 56, 58 of the guide rail 22a (or 22b), and first, second, and third elastic plates 84a, 84b, 84c are mounted in respective recesses defined in surfaces of the block 82 and held in sliding contact with the respective first, second, third side surfaces 54, 56, 58 of the guide rail 22a (or 22b) for absorbing vibrations caused when the guide mechanism is in operation.

The guide mechanism 24 according to the present invention may preferably be incorporated in any of various actuators such as an electric actuator as disclosed in U.S. patent application Ser. No. 08/321,771.

Figure 7:
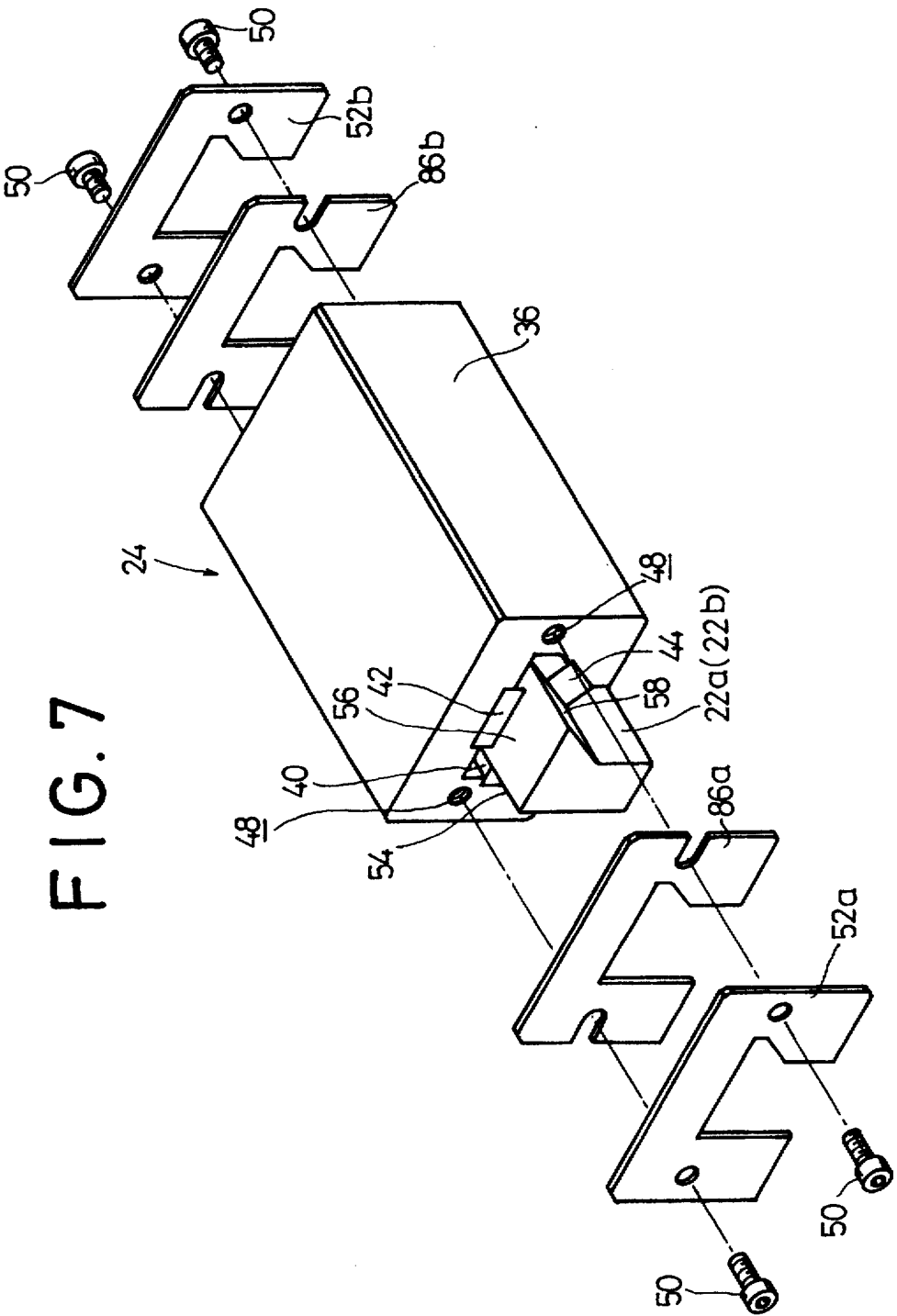
FIG. 7 is an exploded perspective view of a guide mechanism according to still another embodiment of the present invention.

FIG. 7 shows a guide mechanism according to still another embodiment of the present invention. The guide mechanism shown in FIG. 7 differs from the guide mechanism 24 shown in FIG. 1 in that scrapers 86a, 86b are interposed between the opposite ends of the guide block 36 and the end plates 52a, 52b. The scrapers 86a, 86b may be made of a spongy material of PVA (polyvinyl alcohol) or the like for preventing dirt and dust particles from being scattered out from the rollingly contacting members of the guide mechanism 24.

The guide mechanisms according to the present invention offer the following advantages:

The rollers held in rolling contact with the guide rail are subject to reduced frictional resistance and, hence any wear on the rollingly contacting members is minimized.

Since the guide mechanism is of a simple structure with the rollers rotatably mounted in the roller carrier plates, the guide mechanism can be manufactured easily and inexpensively.

Inasmuch as the roller carrier plates are wholly or partly made of an elastic material or the rollers are made of an elastic material, they are effective in absorbing vibrations produced by the rollingly contacting members to smoothly displace the guide block along the guide rail.

Although certain preferred embodiments of the present invention have been shown and described in detail, it should be understood that various changes and modifications may be made therein without departing from the scope of the appended claims.

What is claimed is:

1. A guide mechanism comprising:

a linear guide rail;

a guide block displaceable along said linear guide rail;

a roller carrier plate interposed between said linear guide rail and said guide block, said carrier plate having a plurality of recesses defined in one side surface thereof; and a plurality of rollers complementarily fitted into said recesses and held in rolling contact with a side surface of said linear guide rail.

2. A guide mechanism according to claim 1, wherein said linear guide rail has a plurality of longitudinal side surfaces, and said roller carrier plate comprises a plurality of roller carrier plates facing said longitudinal side surfaces.

3. A guide mechanism according to claim 2, wherein said roller carrier plates are wholly or partly made of an elastic material.

4. A guide mechanism according to claim 2, wherein said rollers are made of an elastic material.

5. A guide mechanism according to claim 2, wherein said longitudinal side surfaces include a first longitudinal side surface, a second longitudinal side surface extending substantially perpendicularly to the first longitudinal side surface, and a third longitudinal side surface extending obliquely at a predetermined angle from said second longitudinal side surface.

6. A guide mechanism according to claim 1, further comprising a pair of end plates mounted respectively on opposite axial ends of said guide block and holding aid roller carrier plate.

7. A guide mechanism according to claim 1, wherein said roller carrier plate is wholly or partly made of an elastic material.

8. A guide mechanism according to claim 1, wherein said rollers are made of an elastic material.

9. A guide mechanism according to claim 1, wherein said rollers protrude from one side only of said roller carrier plate which faces said guide rail.

10. A guide mechanism according to claim 1, wherein said rollers protrude from one side only of said roller carrier plate which faces said guide rail.

11. A guide mechanism comprising:

a linear guide rail;

a guide block displaceable along said linear guide rail;

a roller carrier plate interposed between said linear guide rail and said guide block, said carrier plate having a plurality of cylindrical recesses defined in one side surface thereof; and a plurality of cylindrical rollers complementarily fitted in said recesses and held in rolling contact with a side surface of said linear guide rail.

* * * * *